(12) United States Patent
Kim et al.

(10) Patent No.: US 10,036,884 B2
(45) Date of Patent: Jul. 31, 2018

(54) DISPLAY INCLUDING ELECTROWETTING PRISM ARRAY

(71) Applicant: SAMSUNG ELECTRONICS CO., LTD., Suwon-si (KR)

(72) Inventors: Yun-hee Kim, Seoul (KR); Hoon Song, Yongin-si (KR); Jung-mok Bae, Seoul (KR); Kyu-hwan Choi, Yongin-si (KR); Yoon-sun Choi, Yongin-si (KR); Yong-joo Kwon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 338 days.

(21) Appl. No.: 14/031,217

(22) Filed: Sep. 19, 2013

(65) Prior Publication Data

US 2014/0168754 A1    Jun. 19, 2014

(30) Foreign Application Priority Data

Dec. 18, 2012  (KR) .................. 10-2012-0148870
Jul. 12, 2013  (KR) .................. 10-2013-0082296

(51) Int. Cl.
G02F 1/00    (2006.01)
G02B 26/00   (2006.01)
G02B 27/22   (2018.01)

(52) U.S. Cl.
CPC ....... *G02B 26/005* (2013.01); *G02B 27/2242* (2013.01)

(58) Field of Classification Search
CPC ...... G02F 1/29; G02F 1/31; G02F 2001/2914; G02B 26/004; G02B 26/005

USPC ................................. 359/315–320
See application file for complete search history.

(56) References Cited

U.S. PATENT DOCUMENTS

| | | |
|---|---|---|
| 5,774,262 A | 6/1998 | Schwerdtner et al. |
| 6,917,456 B2 | 7/2005 | Reboa et al. |
| 2008/0218853 A1* | 9/2008 | Ei-Ghoroury ........ G03B 21/625 359/449 |

(Continued)

FOREIGN PATENT DOCUMENTS

| | | |
|---|---|---|
| KR | 10-0786860 B1 | 12/2007 |
| KR | 10-2010-0139017 A | 12/2010 |

OTHER PUBLICATIONS

Paul F. McManamon, et al; "A Review of Phased Array Steering for Narrow-Band Electrooptical Systems"; Proceedings of the IEEE; vol. 97; No. 6; Jun. 2009; pp. 1078-1096.

(Continued)

*Primary Examiner* — Robert E Tallman
(74) *Attorney, Agent, or Firm* — Sughrue Mion, PLLC (57) ABSTRACT

A display including an electrowetting prism array is provided. The display includes: a light source, a 2-dimensional (2D) display for providing an image using light from the light source, a prism array in which a refractive power of one or more prisms of the prism array is adjustable in real time, and an optical element which increases a refraction of light transmitted therethrough. In the display, the optical element may be disposed in front of or behind the prism array. The optical element may be a convex lens, a Fresnel lens, a holographic optical element (HOE), a diffraction optical element (DOE), or a second electrowetting prism array. The convex lens may be a variable focus lens.

14 Claims, 6 Drawing Sheets

(56) References Cited

U.S. PATENT DOCUMENTS

| | | | |
|---|---|---|---|
| 2008/0316302 A1 | 12/2008 | Vos et al. | |
| 2010/0195190 A1* | 8/2010 | Ishioka | G02B 26/004 |
| | | | 359/316 |
| 2011/0063289 A1* | 3/2011 | Gantz | G03H 1/02 |
| | | | 345/419 |
| 2011/0273643 A1* | 11/2011 | Arai | G02F 1/133528 |
| | | | 349/64 |
| 2012/0194563 A1* | 8/2012 | Liang | G02B 26/005 |
| | | | 345/690 |
| 2012/0307357 A1* | 12/2012 | Choi | G02B 26/005 |
| | | | 359/462 |

OTHER PUBLICATIONS

Neil R. Smith, et al; "Agile wide-angle beam steering with electrowetting microprisms", Optics Express; vol. 14; No. 14; Jul. 10, 2006; pp. 6557-6563.

Frieder Mugele, et al; "Electrowetting: from basics to applications"; Institute of Physics Publishing, Journal of Physics Condensed Matter; vol. 17; 2005; pp. R705-R774.

* cited by examiner

DISPLAY INCLUDING ELECTROWETTING PRISM ARRAY

CROSS-REFERENCE TO RELATED APPLICATION

This application claims priority from Korean Patent Application Nos. 10-2012-0148870, filed on Dec. 18, 2012, and 10-2013-0082296, filed on Jul. 12, 2013, in the Korean Intellectual Property Office, the disclosures of which are incorporated herein in their entirety by reference.

BACKGROUND

1. Field

Apparatuses consistent with exemplary embodiments relate to a display, and more particularly, to a display including an electrowetting prism array and capable of converting 2-dimensional (2D) images to 3-dimensional (3D) images.

2. Description of the Related Art

Among technologies for displaying 3D videos, a technology using a binocular parallax separately provides two 2D images having binocular parallax to a left eye and a right eye. The two 2D images captured by a stereo camera approximate images acquired by the left and right eyes.

Methods of observing a 3D image based on two 2D images includes methods using glasses and methods not using glasses Methods using glasses include an anaglyph type method, a Pulfrich type method, a polarized filter type method, and a liquid crystal display (LCD) shutter type method.

3D image viewing methods that do not use glasses include a parallax barrier type method and a lenticular type method.

Nowadays, 3D displays use electrowetting prism arrays. The contact angle of a prism included in an electrowetting prism array is limited to within a predetermined range. That the contact angle of the prism included in the electrowetting prism array is limited to within the predetermined range denotes that beam steering of the electrowetting prism array is limited. When the beam steering of the electrowetting prism array is limited, the refractive power or refraction ability of the electrowetting prism array is limited, the viewing angle and the viewing zone become limited or narrow, and reducing the viewing distance (the minimum distance capable of viewing a 3D image) may be limited.

SUMMARY

One or more exemplary embodiments may provide displays capable of observing 2D/3D images in a broader region and lowering a driving voltage.

Additional exemplary aspects and advantages will be set forth in part in the description which follows and, in part, will be apparent from the description, or may be learned by practice of the presented embodiments.

According to an aspect of an exemplary embodiment, a display including: a light source; a 2-dimensional (2D) display for providing an image using a light from the light source; a prism array for controlling a traveling direction of the image in real time; and an optical element for increasing refractive power of a light emitted from the prism array.

In the display, the optical element may be disposed in front of or behind the prism array.

The optical element may be one of a convex lens, a Fresnel lens, a holographic optical element (HOE), a diffraction optical element (DOE), a liquid crystal lens, and any optical element operating as a lens. In addition, the optical element may be a film playing a role of a lens or a second electrowetting prism array.

The convex lens may be a variable focus lens.

The prism array may be a first electrowetting prism array formed to play the role of a convex lens.

The prism array may be a first electrowetting prism array formed to play the role of a concave lens.

All of the plurality of prisms forming the prism array may have the same refractive characteristic.

The 2D display may have a small collimation angle.

The 2D display may be a 2D display formed to provide directional light.

The optical element may include an optical element changing light diverged from the prism array to a collimated light.

The prism array may be a non-variable prism array for controlling a traveling direction of the image to a predetermined direction.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Reference will now be made in detail to exemplary embodiments illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. In the drawings, the thicknesses of layers or regions are exaggerated for clarity.

Figure 1:
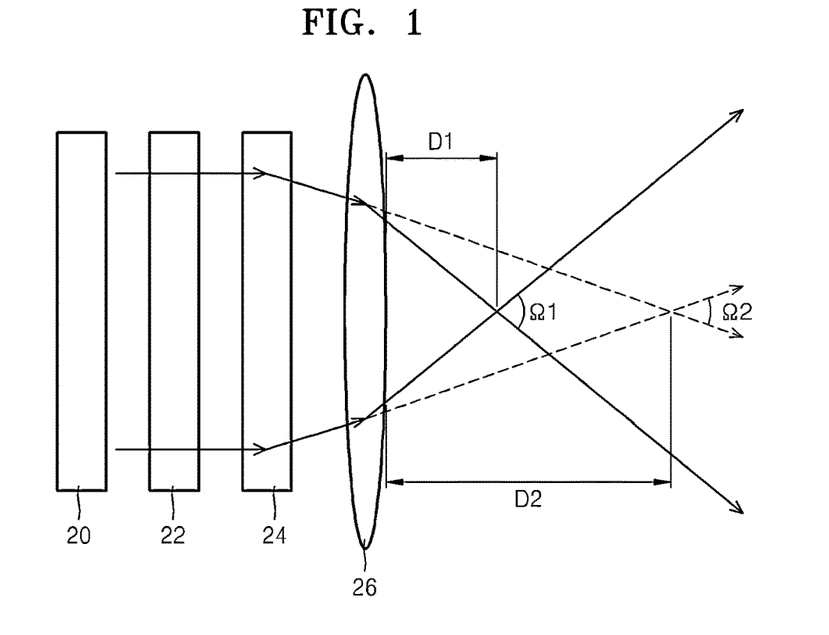
FIG. 1 is a cross-sectional view of a display including an electrowetting prism array according to an exemplary embodiment.

FIG. 1 is a cross-sectional view of a display (hereinafter, referred to as a first display) including an electrowetting prism array according to an exemplary embodiment.

Referring to FIG. 1, the first display includes a light source 20, a liquid crystal panel 22 for creating an image, an electrowetting prism array (hereinafter, prism array) 24 for controlling a traveling direction of the image output from the liquid crystal panel 22, and a lens 26. The lens 26 collects lights output from the prism array 24. The lens 26 may be a Fresnel lens, a holographic optical element (HOE), or a diffraction optical element (DOE). Also, the lens 26 may be a film playing the role of a lens. The lens 26 may be a liquid crystal lens. The lens 26 may be an optical element operating as a lens. A refractive power of the lens 26 may be greater than that of the prism array 24. The light source 20 may be a backlight unit generally used as a light source of a liquid crystal display. The light source 20 may be a light source including a plurality of light-emitting diodes. The liquid crystal panel 22 may be a general liquid crystal panel including a liquid crystal and electrodes respectively on front and rear sides of the liquid crystal. The liquid crystal panel 22 may be a 2D display whose collimation angle is small. In addition, the liquid crystal panel 22 may be a 2D display providing a directional light. The liquid crystal panel 22 may be a transmissive type or a light-emitting type. Instead of the liquid crystal panel 22, various 2D displays may be used such as an organic light-emitting diode (OLED) display or a plasma display panel (PDP). When an OLED display or a PDP is used, a light sheet or a separate optical system may be used for light collimation.

When a lens having positive power exists in front of the prism array 24, namely, between the prism array 24 and an observer, light refracted at the prism array 24 may be refracted again by the lens 26. According to this, a refractive angle of the light which has passed through the lens 26 is greater than a refractive angle of the light which has only passed through the prism array 24. Accordingly, a first distance D1 between a position of the lens 26 and a position where light (denoted as a solid line) is focused after having passed through the lens 26 is shorter than a second distance D2 between a position where the lens 26 would be disposed and a position where light (denoted as a dashed line) is focused after having passed through only the prism array (24). When a refractive angle of light refracted by the prism array 24 is a maximum, the first distance D1 and the second distance D2 respectively become minimum observation distances when the lens 26 exists and when the lens 26 does not exist. Comparing the first and second distances D1 and D2, it can be seen that the minimum observation distance becomes shorter when the lens 26 exists. That is, when the lens 26 exists rather than when the lens 26 does not exist, a minimum observation distance where a 3D image can be observed becomes shorter. In other words, the observer can observe a 3D image at a closer position when the lens 26 exists.

Also, due to existence of the lens 26, the refractive angle becomes greater than the one of a case where the lens 26 does not exist. Accordingly, a viewing angle Ω1 in a case where the lens 26 exists becomes greater than a viewing angle Ω2 in a case where the lens 26 does not exist. Since a viewing angle becomes greater, a viewing zone becomes much greater when the lens 26 exists than when the lens 26 does not exist.

Figure 2:
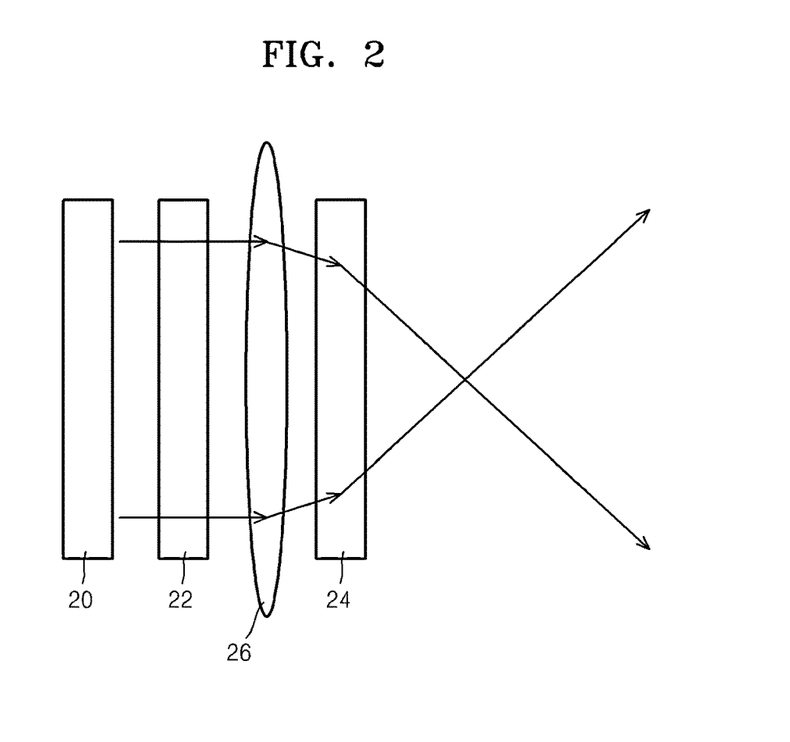
FIG. 2 is a cross-sectional view of a display including an elecrowetting prism array according to another exemplary embodiment.

FIG. 2 is a cross sectional view illustrating an example of a configuration of a display (hereinafter, a second display) including a prism array according to another exemplary embodiment.

Referring to FIG. 2, a lens 26 in the second display exists between the liquid crystal panel 22 and the prism array 24. The rest of the configuration may be identical to the configuration of the first display.

Figure 3:
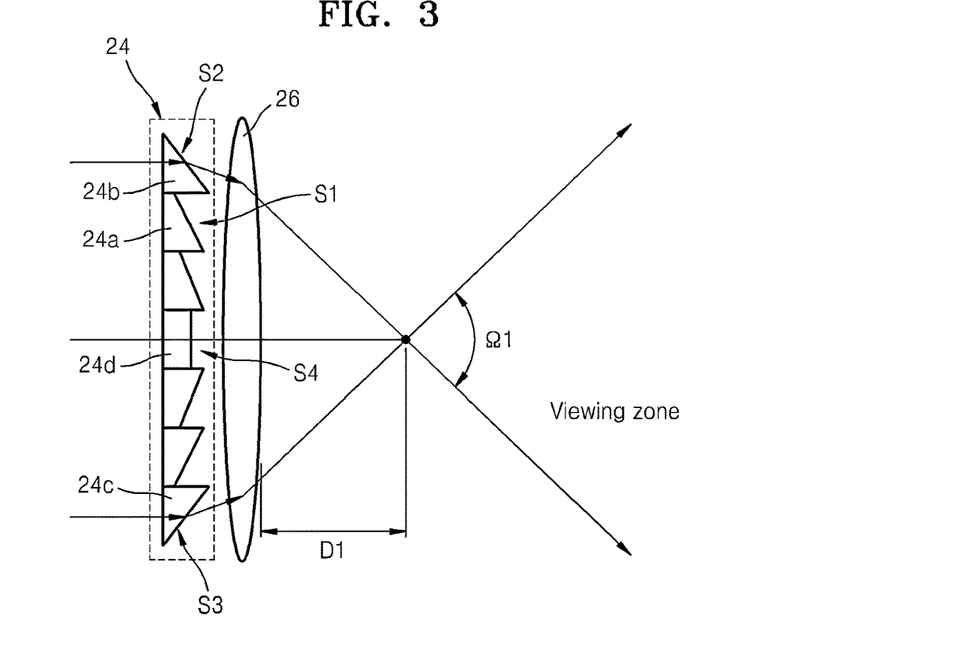
FIG. 3 is a cross-sectional view illustrating an example of the prism array of FIG. 1.

FIG. 3 illustrates an example of the prism array 24 of FIG. 1.

Referring to FIG. 3, the prism array 24 includes a plurality of electrowetting prisms 24a. In FIG. 3, the plurality of electrowetting prisms 24a are simply illustrated for convenience. A detailed description of the electrowetting prisms 24a will be described later. Interfaces S1 of the plurality of electrowetting prisms 24a indicate interfaces of liquids which fill the electrowetting prisms 24a and have different refractive indices. An inclination angle or a contact angle of the interfaces S1 may be adjusted by a voltage applied to the electrowetting prism 24a, and accordingly a traveling direction of the light incident on the electrowetting prism 24a may be controlled by the applied voltage. In other words, a refractive angle of the light transmitted through the electrowetting prism 24a may be adjusted by the voltage applied to the electrowetting prism 24a and accordingly a (super multiview) stereoscopic 3D image may be provided to an observer positioned at an arbitrary position within a viewing zone by adjusting a driving voltage applied to the electrowetting prism 24a. Since a refractive characteristic of the electrowetting prism 24a differs according to an applied driving voltage, an inclination of the interface S1 of the electrowetting prism 24a may also differ according to a position on the electrowetting prism 24a. The prism array 24 of FIG. 3 may play the role of a convex lens. In FIG. 3, an interface S2 of the electrowetting prism 24a at a position corresponding to an upper end edge of the lens 26 may have a contact angle causing a maximum refraction. In the same manner, an interface S3 of an electrowetting prism 24c at a position corresponding to a lower end edge of the lens 26 may also have a contact angle causing a maximum refraction. In addition, an interface S4 of an electrowetting prism 24d at a position corresponding to a center of the lens 26 is perpendicular to incident light. For prisms distributed between a center prism 24b and the upper edge electrowetting prism 24d, contact angles thereof may be controlled to cause refractive angles to decrease towards the center of the prism array 24. Contact angles of prisms distributed between the lower edge electrowetting prism 24c and the center prism 24d may also be controlled to cause refractive angles to decrease towards the center of the prism array 24. Interfaces of prisms distributed in an upper side around the electrowetting prism 24d at the center of the prism array 24 may be symmetric with interfaces of prisms distributed in a lower side around the electrowetting prism 24d. In this case, a 3D image may be observed at a position separated from the lens 26 by the first distance D1 on an optical axis passing through a center of the lens 26. When electrowetting prisms 24b and 24c in an edge side have angles causing maximum refraction, the first distance D1 becomes a minimum observation distance where the 3D image can be observed. When the edge side electrowetting prisms 24b and 24c are controlled to have smaller refractive angles than the maximum refractive angles, and inner side prisms are controlled to have angles causing less refraction than the ones as shown in FIG. 1, the 3D image may be observed at a farther position than the first distance D1. The 3D image may be observed within a viewing zone determined by the viewing angle Ω1. The 3D image may be provided to the observer using an eye-tracking method in which the two eyes of the observer in the viewing zone are tracked. In this eye-tracking method, a final position where the 3D image is to be formed may be determined by reflecting a focal length of the lens 26 in a result by the prism array 24. In the eye-tracking method, an image is divided in a time divisional manner or in a space divisional manner, and the divided and differentiated images are provided to the two eyes of the observer. Accordingly, the observer may observe an image having parallax, namely, a 3D image. The images divided in the time divisional manner and the space divisional manner may be provided by adjusting a driving voltage applied to the prism array 24.

Figure 4:
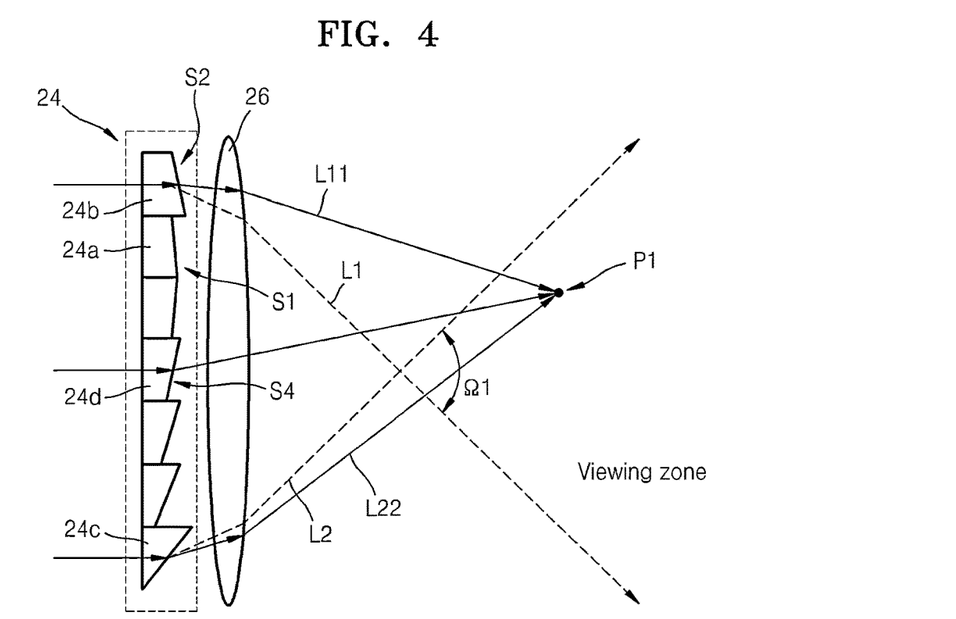
FIG. 4 is a cross-sectional view illustrating changes of interfaces of elecrowetting prisms according to a position where a 3D image is observed.

FIG. 4 is a view illustrating changes of interfaces of electrowetting prisms according to a 3D image observation position.

Referring to FIG. 4, when a position P1 of an observer who observes a 3D image is on a right side of the observer of FIG. 3, contact angles of a plurality of elecrowetting prisms 24a to 24d forming the prism array 24 are adjusted in order for the 3D image to be formed at this position P1. The position P1 of the observer is deviated from an optical axis passing through the center of the lens 26. The 3D image has to be observed at this position P1. Accordingly, in FIG. 4, a distribution of the interfaces of the plurality of prisms 24a to 24d differs from the one of FIG. 3. That is, in FIG. 3, a contact angle of the interface S4 of the electrowetting prism 24d corresponds to 90 degrees, but the contact angle in FIG. 4 becomes greater than 90 degrees. In addition, a refractive power of the electrowetting prism 24b disposed at an upper side edge in FIG. 4 is less than that shown in FIG. 3. Accordingly a refractive angle of light passing through the electrowetting prism 24b in FIG. 4 is less than that shown in FIG. 3. Refracted lights L1 and L2, denoted as dashed lines in FIG. 4, represent the refracted light in FIG. 3. Comparing the refracted lights L1 and L2, denoted as the dashed lines, with refracted lights L11 and L22, denoted as solid lines, the refractive power of the prism array 24 having the interface distribution of electrowetting prisms 24a to 24d as illustrated in FIG. 4 is weaker than a case where an interface distribution of the electrowetting prisms 24a to 24d is the same as the one of FIG. 3.

Figure 5:
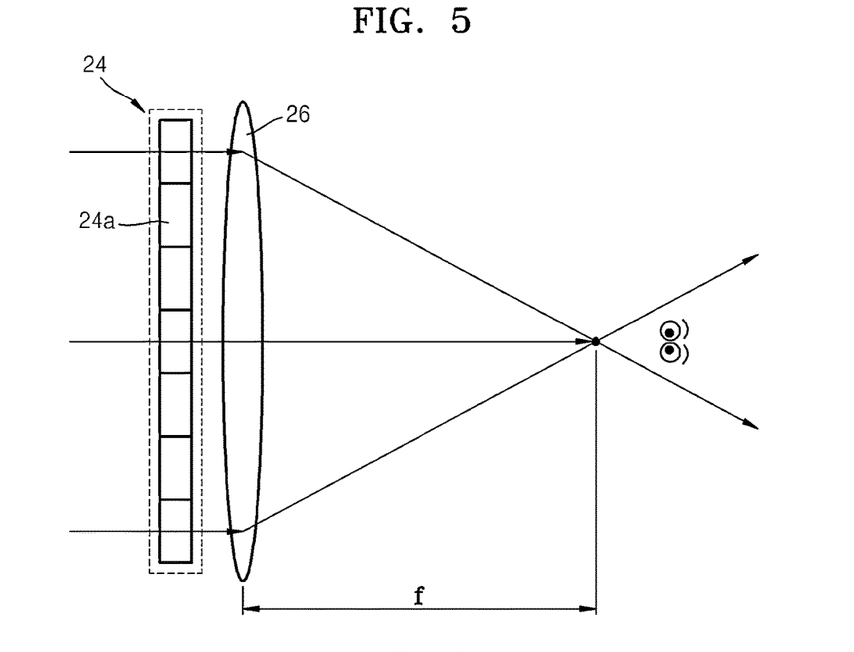
FIG. 5 is a cross-sectional view illustrating an observer positioned in a vicinity of a focal length and on an axis of a central light and a refracted light, when all contact angles of a plurality of prisms forming a prism array are 90 degrees.

FIG. 5 is a view illustrating an observer positioned in a vicinity of a focal length and on an axis of a central light and a refracted light, when all of the contact angles of the plurality of prisms 24a forming a prism array 24 are 90 degrees, namely, an interface of each prism 24a is flat.

When all of the contact angles of the plurality of prisms 24a are 90 degrees, the prism array 24 is the same as a prism having a uniform thickness and refraction does not occur in the prism array 24. Accordingly, collimated light which is incident on the prism array 24 forms an image at a focus of the lens 26. A focal length f of the lens 26 may be greater than the minimum observation distance D1.

Figure 6:
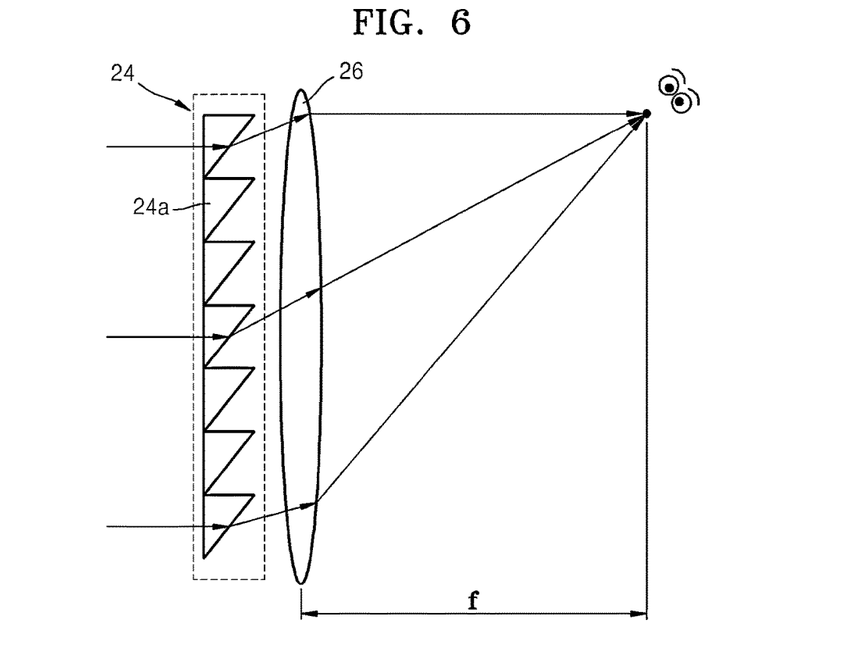
FIG. 6 is a cross-sectional view illustrating a 3D image formation when all contact angles of a plurality of prisms forming a prism array are the same and greater than 90 degrees.
Figure 7:
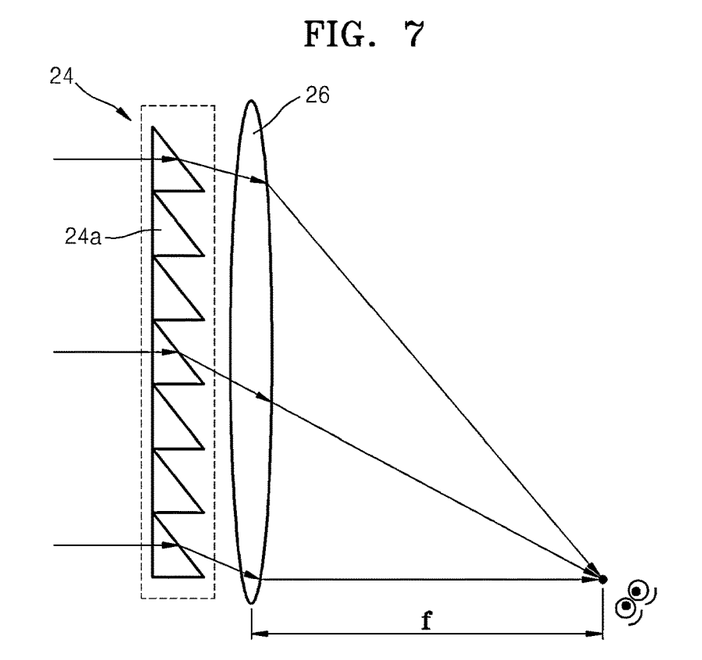
FIG. 7 is a cross-sectional view illustrating a 3D image formation when all of contact angles of a plurality of prisms forming a prism array are the same and less than 90 degrees.

FIGS. 6 and 7 show cases where contact angles of interfaces of a plurality of prisms 24a forming the prism array 24 of FIG. 1 are the same in a range greater than or smaller than 90 degrees and refractive powers thereof are the same.

FIG. 6 illustrates a 3D image formation when all contact angles of the plurality of prisms 24a are the same and are all greater than 90 degrees. In FIG. 6, light incident on the prism array 24 is refracted to a left side of a traveling direction of the light and then enters the lens 26. In FIG. 6, since the angles by which the light transmitted through all of the plurality of prisms 24a are the same, the light refracted by the plurality of prisms 24a is still collimated light, but the traveling direction thereof is changed. Accordingly, light incident on the lens 26 after passing through the prism array 24 is collimated light which is obliquely incident, in a left direction, on the lens 26. The collimated light obliquely incident on the lens 26 forms an image on a focal plane. At this time, an image forming position is shifted to a left side of the light incident on the prism array 24, as compared with a case of FIG. 5. The focal plane which passes through the focus of the lens 26 and is located at a focal length f may be a surface perpendicular to a virtual optical axis passing through the focus and the center of the lens 26. In FIGS. 5 and 6, the light passing through the prism array 24 and incident on the lens 26 is collimated light, and forms an image on the focal surface. Accordingly, an observer positioned at the focal plane of the lens 26 can observe a 3D image. However, a region where the 3D image can be observed may be limited to the focal plane, since the focus of the lens 26 is located on the focal plane.

FIG. 7 illustrates a case contrary to the one of FIG. 6. That is, FIG. 7 is a view illustrating a 3D image formation, when all of the contact angles of the plurality of prisms 24a are the same and less than 90 degrees.

Referring to FIG. 7, light incident on the prism array 24 is refracted to a right side of the traveling direction of the light, and obliquely and collimatedly incident on the lens 26. Since the collimated light incident on the lens 26 is obliquely incident in a right direction of the traveling direction of the light incident on the prism array 24, a 3D image forming position on the focal plane is shifted to a right side of the traveling direction of the light incident on the prism array 24, compared to the case of FIG. 5. In the case of FIG. 7, a region where a 3D image can be observed may be limited to the focal plane.

In FIGS. 5, 6 and 7, the plurality of prisms 24a forming the prism array 24 have the same contact angles. By applying a driving voltage under the same condition to the plurality of prisms 24a respectively, the plurality of prisms 24a may have the same contact angles. Accordingly, in the cases of FIGS. 5 to 7, driving the prism array 24 may be easy and simple. However, as described above, a 3D image forming region may be limited to the focal plane of the lens 26.

Figure 8:
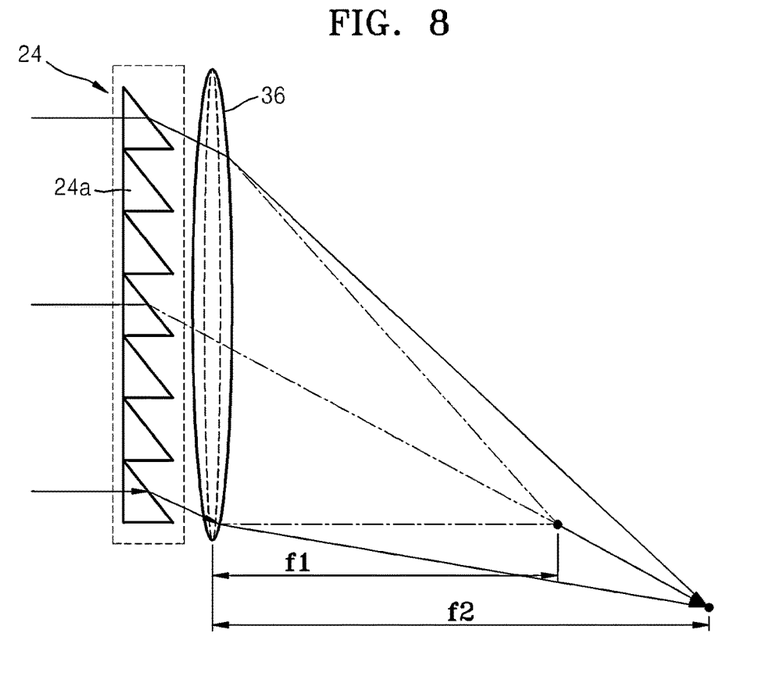
FIG. 8 is a cross-sectional view illustrating a case of replacing the lens of FIG. 7 with a variable focus lens.

FIG. 8 illustrates a case where the lens 26 of FIG. 7 is replaced with a variable focus lens 36. In FIGS. 5 and 6, the lens 26 may be replaced with a variable focus lens 36.

Referring to FIG. 8, when the variable focus lens 36 has a shape drawn in a solid line, the variable focus lens 36 may be the same as the lens 26 of FIGS. 5 to 7. Accordingly, a first focal length f1 of the variable focus lens 36 may be the same as the focal length f of the lens 26 of FIGS. 5 to 7.

When the variable focus lens 36 has a shape drawn in a dashed line, namely, when the variable focus lens 36 has a thickness smaller than the lens 26 of FIGS. 5 to 7, the refractive power of the variable focus lens 36 may be less than the lens 26 of FIGS. 5 to 7. Accordingly, at this time, a second focal length f2 of the variable focus lens 36 is longer than the first focal length f1. By varying the focal length of the variable focus lens 36 like this, a 3D image forming position may not be limited to a particular focal plane, but an image may be formed on any of a plurality of focal planes whose focal lengths are different. Accordingly, in FIG. 8, a viewing zone may be much broader than the ones of FIGS. 5 to 7.

Figure 9:
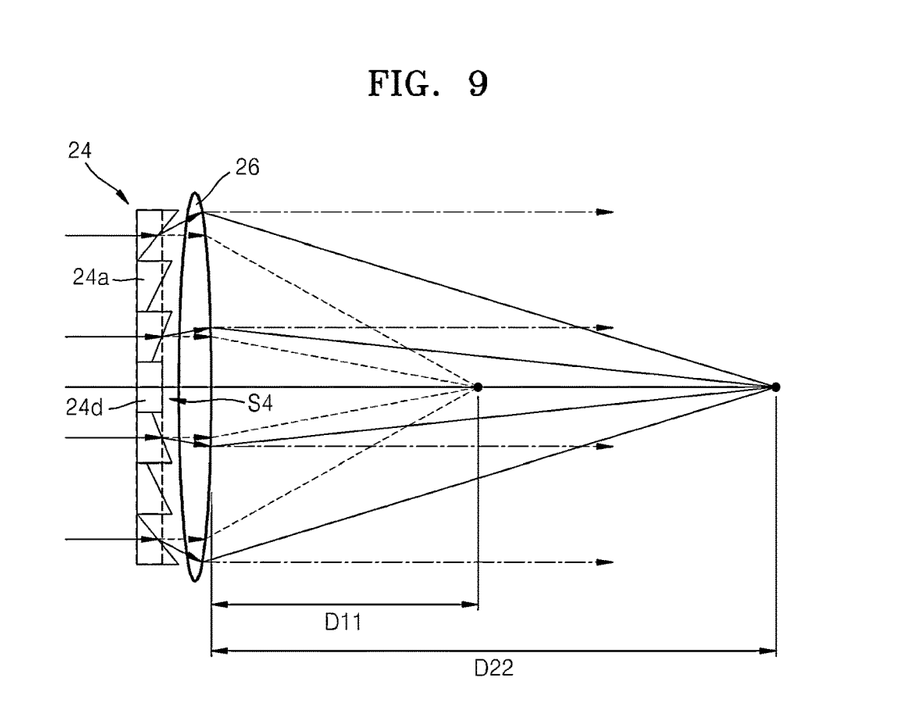
FIG. 9 is a cross-sectional view illustrating a 3D image formation when the prism array of FIG. 1 operates as a concave lens.

FIG. 9 is a view illustrating 3D image formation when the prism array 24 of FIG. 1 plays a role of a concave lens.

Referring to FIG. 9, a prism 24d positioned at a center of the prism array 24 from among a plurality of prisms 24a to 24d forming the prism array 24 has a contact angle of 90 degrees and an interface S4 thereof is flat. Interfaces of prisms at an upper side of the prism 24d have contact angles greater than 90 degrees. The upper side prisms have greater contact angles as they get closer to an edge side of the prism array 24. Interfaces of prisms at a lower side of the prism 24d have contact angles smaller than 90 degrees. The lower side prisms have smaller contact angles as they get closer to the edge side of the prism array 24. When a distribution of the interfaces of the prisms forming the prism array 24 is like this, light incident on the prism array 24 passes through the prism array 24 and then diverges. From this result, it can be seen that the prism array 24 of FIG. 9 plays the role of a concave lens which diverges the incident light. Accordingly, since the light incident on the lens 26 is not collimated but diverges, a position D22 where the light passing through the lens 26 forms an image is farther than a position D11 where an image is formed when collimated light (dashed lines) is incident on the lens 26. When the prism array 24 is driven to play the role of a concave lens, a 3D image can be observed at a farther position than a position (D1 of FIG. 3) where a 3D image can be seen when the prism array 24 is driven to play the role of a convex lens. In other words, when the prism array 24 plays the role of a concave lens, a position where a 3D image can be observed may be farther than the lens 26 when the prism array 24 plays the role of a convex lens. Accordingly, when the prism array 24 is driven to play the role of a concave lens, a depth of field where a 3D image can be seen may be deeper than one of a case where the prism array 24 is driven to play the role of a convex lens.

When the prism array 24 is driven to play the role of a concave lens, a driving control of the prism array 24 according to an observation position change may be easier than a case where the prism array 24 is driven to play the role of a convex lens. That is, a control margin of a contact angle of each prism may be greater than one in a case where the prism array 24 is used as a convex lens.

In FIG. 9, when light incident on the prism array 24, is refracted to be diverging light, and is then collimated (denoted as long and short dashed lines) while passing through the lens 26, a 2D image can be observed. Accordingly, when the lens 26 in FIG. 9 is replaced with, for example, a variable focus lens 36, conversion between 2D and 3D may be possible.

Also, when the prism array 24 is a plate as shown in dashed lines, namely, the prism array 24 plays the role of a transparent plate, the lens 26 is replaced with the variable focus lens 36, and a focus is adjusted to become infinite, a 3D image may be converted to a 2D image.

In addition, when the prism array 24 is adjusted to play the role of a concave lens, and the lens 26 plays the role of a convex lens, a 3D image may be also converted to a 2D image.

Figure 10:
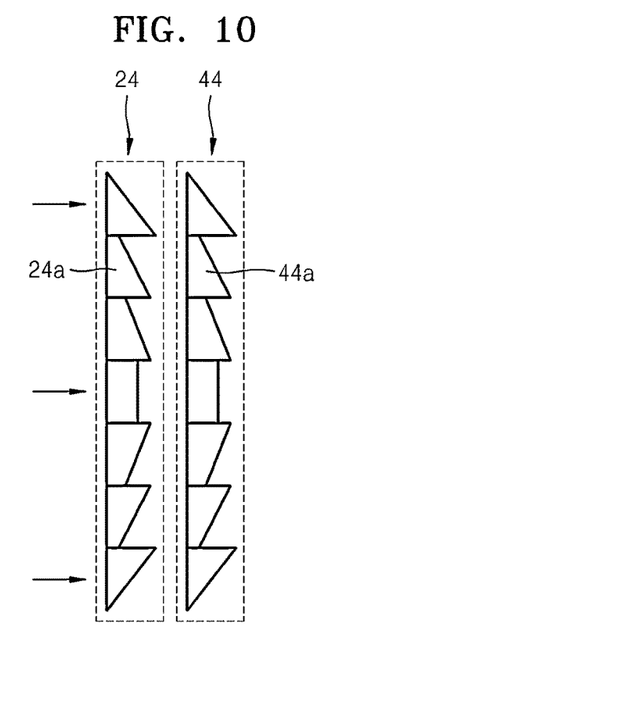
FIG. 10 is a cross-sectional view illustrating a case where the lens of FIG. 1 is an elecrowetting prism array.

FIG. 10 illustrates a case where the lens 26 in FIG. 1 is an electrowetting prism array 44. In this case, a 3D display includes two electrowetting prism arrays 24 and 44.

Figure 11:
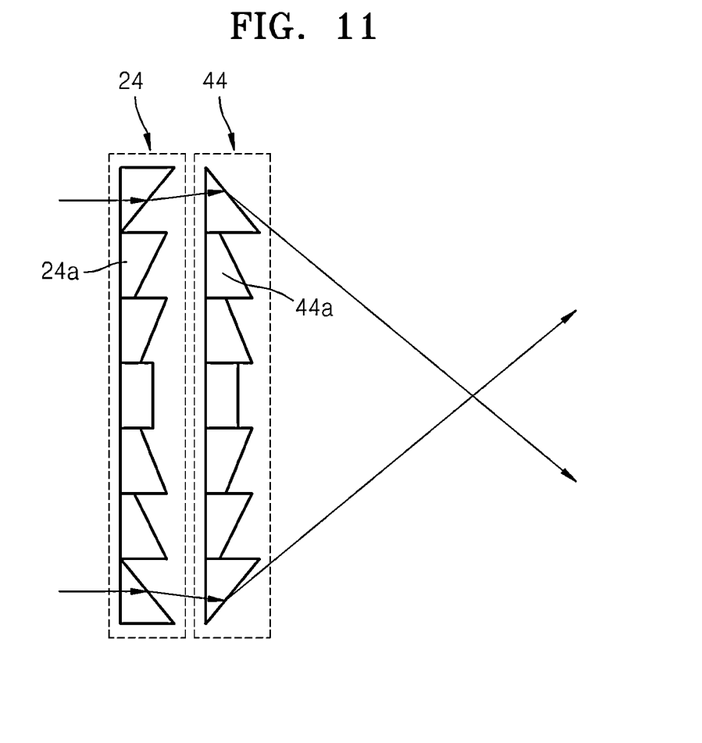
FIG. 11 is a cross-sectional view illustrating a case where a first elecrowetting prism plays a role of a concave lens and a second elecrowetting prism plays a role of a convex lens in FIG. 10.

Referring to FIG. 10, from an interface distribution of prisms 24a and 44a respectively forming the two electrowetting prism array 24 and 44, it can be seen that each of the two electrowetting prism arrays 24 and 44 plays the role of a convex lens. An interface distribution of the prisms 24a of the first prism array 24 may be as one shown in FIGS. 5 to 7. Also, the first prism array 24 may be driven to play the role of a concave lens as shown in FIG. 11. Accordingly, a case shown in FIG. 11 may exhibit the same result as a case shown in FIG. 9.

In FIG. 10, the second electrowetting prism array 44 may be driven to play the role of a variable focus lens. In this case, the result may be the same as one of FIG. 8.

Figure 12:
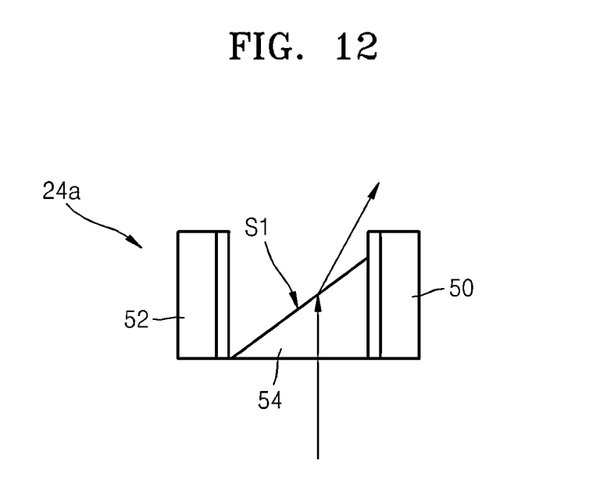
FIG. 12 is a cross-sectional view illustrating an elecrowetting prism forming an elecrowetting prism array included in a display according to exemplary embodiments.

FIG. 12 illustrates a cross-sectional view of an electrowetting prism 24a forming the foregoing prism array. Since a configuration of an electrowetting prism is well known, FIG. 12 illustrates the configuration thereof simply.

Referring to FIG. 12, the electrowetting prism 24a includes first and second electrodes 50 and 52, and a liquid 54 filling therebetween. The liquid 54 may be, for example, oil or water. Above the liquid 54, between the first and the second electrodes 50 and 52, a material having a smaller refractive index than the liquid 54 may be disposed. When an inclination of an interface S1 of the liquid 54 is the same as one of FIG. 12, namely, when a contact angle of the liquid 54 with respect to the first electrode 50 is smaller than 90 degrees, light incident on the electrowetting prism 24a is refracted to a right side of a traveling direction thereof. When the contact angle is greater than 90 degrees, the incident light is refracted to a left side of the traveling direction thereof. When the contact angle of the liquid 54 with respect to the first electrode is 90 degrees, an interface S1 of the liquid 54 becomes flat and the incident light passes through the electrowetting prism 24a without refraction.

The configuration of the electrowetting prism 24a in FIG. 12 may be applied to the prism 44a of the second electrowetting prism array 44 in FIG. 10.

As means for increasing the refraction of the light in the above-described embodiments, the lens 26 or 36 may compensate for the refractive power of the prism array 24, even though the refractive power of the prism array 24 may be less than that of a related art device. Lowering the refractive power of the prism array 24 indicates a lowering of the driving voltage of the prism array 24. Accordingly, the driving voltage of the prism array 24 may be lowered by disposing the lens 26 or 36 in front of or behind the prism array 24 as in the above described embodiments.

As described above, according to the one or more of the above exemplary embodiments, a display capable of 2D/3D conversion includes a lens for increasing a refractive power in front of or behind an electrowetting prism array. Accordingly, the refractive power of the display is increased. Therefore a minimum observation distance becomes shorter than a case without a lens, and a viewing angle and a viewing zone can increase.

In addition, by driving an electrowetting prism array to play the role of a concave lens, a depth of field can be deeper (namely, an observation distance can be increased) than a case where the electrowetting prism array plays the role of a convex lens, and a control margin of a prism contact angle can increase. Thus, providing a 3D image to a long distance can be easy. In addition, when an electrowetting prism array is driven to play the role of a concave lens, conversion between 2D and 3D is possible.

Also, due to the inclusion of the lens having high refractive power as described above, the refractive power of a prism array can be lowered by an amount of the refractive power increased by the lens, which indicates that the driving voltage of the prism array can be lowered. Accordingly this may help to lower the driving voltage of a display.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A display comprising:
a light source;
a 2-dimensional (2D) display which provides an image using light from the light source;
a prism array, comprising a plurality of prisms, wherein a refractive power of one or more of the plurality of prisms of the prism array is adjustable in real time; and
an optical element which increases a refraction of light transmitted therethrough,
wherein the optical element is fixed in a position in which light transmitted through each of the plurality of prisms is transmitted through the optical element and a focal length of the optical element is not variable; and
wherein the optical element is configured to function as a single lens, to receive divergent light from the prism array, and to emit collimated light.

2. The display according to claim 1, wherein the optical element is disposed to receive light transmitted by the prism array.

3. The display according to claim 1, wherein the optical element is disposed such that light emitted by the optical element is incident on the prism array.

4. The display according to claim 1, wherein the optical element is one of a convex lens, a Fresnel lens, a holographic optical element, and a diffraction optical element (DOE).

5. The display according to claim 1, wherein the prism array is a first electrowetting prism array.

6. The display according to claim 1, wherein the prism array comprises prisms disposed such that the prism array operates as a convex lens.

7. The display according to claim 1, wherein the prism array comprises prisms disposed such that the prism array operates as a concave lens.

8. The display according to claim 1, wherein the optical element is a film operating as the single lens.

9. The display according to claim 1, wherein the prism array comprises a plurality of prisms, wherein all of the plurality of prisms have the same refractive characteristic.

10. The display according to claim 1, wherein the 2D display is configured to provide directional light.

11. A display comprising:
a light source;
a 2-dimensional (2D) display which provides an image using light from the light source;
a non-variable prism array arranged such that light output from the display propagates through the non-variable prism array and configured to control a traveling direction of an image output from the 2D display; and
an optical element which increases a refraction of light transmitted therethrough;
wherein the display comprises only one non-variable prism array; and
wherein the optical element is configured to receive divergent light from the non-variable prism array and to emit collimated light.

12. The display according to claim 5, wherein the prism array comprises prisms disposed such that the prism array operates as a convex lens.

13. The display according to claim 5, wherein the prism array comprises prisms disposed such that the prism array operates as a concave lens.

14. A display comprising:
a light source,
a display which provides an image using light emitted from the light source;
an electrowetting prism array; and
an optical element which increases a refraction of light transmitted therethrough,
wherein the optical element is fixed in a position in which all light transmitted through the electrowetting prism array is transmitted through the optical element, a focal length of the optical element is not variable, and the optical element is configured to function as a single lens, and
wherein the optical element is further configured to receive divergent light from the electrowetting prism array and to emit collimated light.

* * * * *